(12) United States Patent
Park et al.

(10) Patent No.: US 12,540,561 B1
(45) Date of Patent: Feb. 3, 2026

(54) THERMALLY ACTIVATED FLOW CONTROL DEVICE

(71) Applicant: The Boeing Company, Arlington, VA (US)

(72) Inventors: Duk Woo Park, Bothell, WA (US); Matthew R. Muehlhausen, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/882,918

(22) Filed: Sep. 12, 2024

(51) Int. Cl.
*F01D 21/00* (2006.01)
*F01D 17/00* (2006.01)
*F01D 25/02* (2006.01)

(52) U.S. Cl.
CPC .......... *F01D 21/003* (2013.01); *F01D 17/00* (2013.01); *F01D 25/02* (2013.01); *F05D 2260/80* (2013.01)

(58) Field of Classification Search
CPC ........ F01D 21/003; F01D 17/00; F01D 25/02; F01D 25/08; F01D 25/12; F01D 25/14; F01D 25/24; F05D 2260/80
See application file for complete search history.

(56) References Cited

U.S. PATENT DOCUMENTS

| | | | |
|---|---|---|---|
| 5,230,603 A | 7/1993 | Day | |
| 8,991,191 B2 * | 3/2015 | Diaz | F02K 1/822 |
| | | | 60/785 |
| 2011/0120075 A1 | 5/2011 | Diaz et al. | |
| 2012/0321452 A1 * | 12/2012 | Miranda | F02C 7/141 |
| | | | 415/180 |
| 2015/0285087 A1 * | 10/2015 | Jalbert | G01B 7/14 |
| | | | 415/173.2 |
| 2020/0025072 A1 * | 1/2020 | Mackin | B64C 23/06 |
| 2023/0010301 A1 * | 1/2023 | Chassagne | F02C 7/14 |
| 2023/0174246 A1 * | 6/2023 | Hoffman | F02C 7/18 |

FOREIGN PATENT DOCUMENTS

| | | |
|---|---|---|
| BE | 1026810 A1 | 6/2020 |
| CN | 102900539 B | 1/2013 |
| GB | 1210202 A | 10/1970 |

OTHER PUBLICATIONS

'Thermal Actuators'. ThermOmegaTech, Inc. [online]. 2024, [retrieved on Jun. 4, 2025]. Retrieved from the Internet: <https://www.thermomegatech.com/wp-content/uploads/2022/03/Thermal-Actuators.pdf> (Year: 2024).*
European Patent Office Extended Search Report, dated Dec. 4, 2025, regarding Application No. EP25187438.4, 8 pages.

* cited by examiner

*Primary Examiner* — Elton K Wong
(74) *Attorney, Agent, or Firm* — Yee & Associates, P.C.

(57) ABSTRACT

Systems, apparatuses and methods can provide for technology includes a turbofan engine subassembly having an inlet surface with a first side and a second side, and one or more flow effectors coupled to the inlet surface, wherein the flow effector(s) transition from a retracted position to an extended position on the second side of the inlet surface in response to an ambient temperature on the first side of the inlet surface exceeding a first threshold. The flow effector(s) may also transition from the extended position to the retracted position in response to the ambient temperature on the first side of the inlet surface falling below a second threshold.

20 Claims, 5 Drawing Sheets

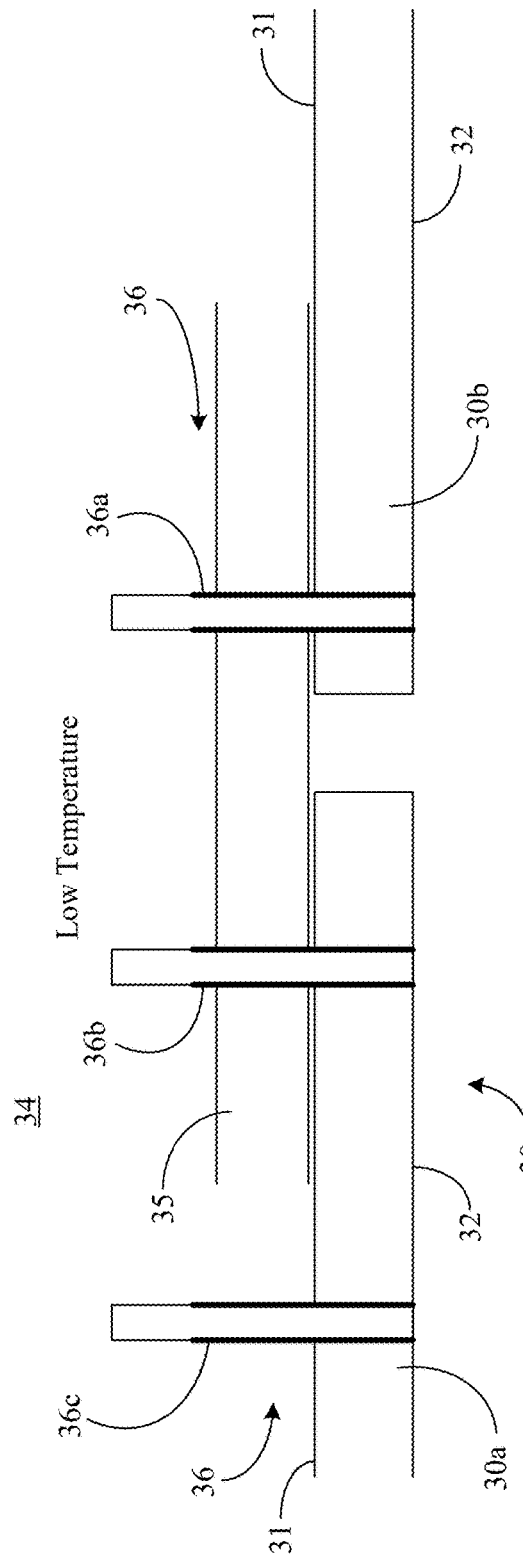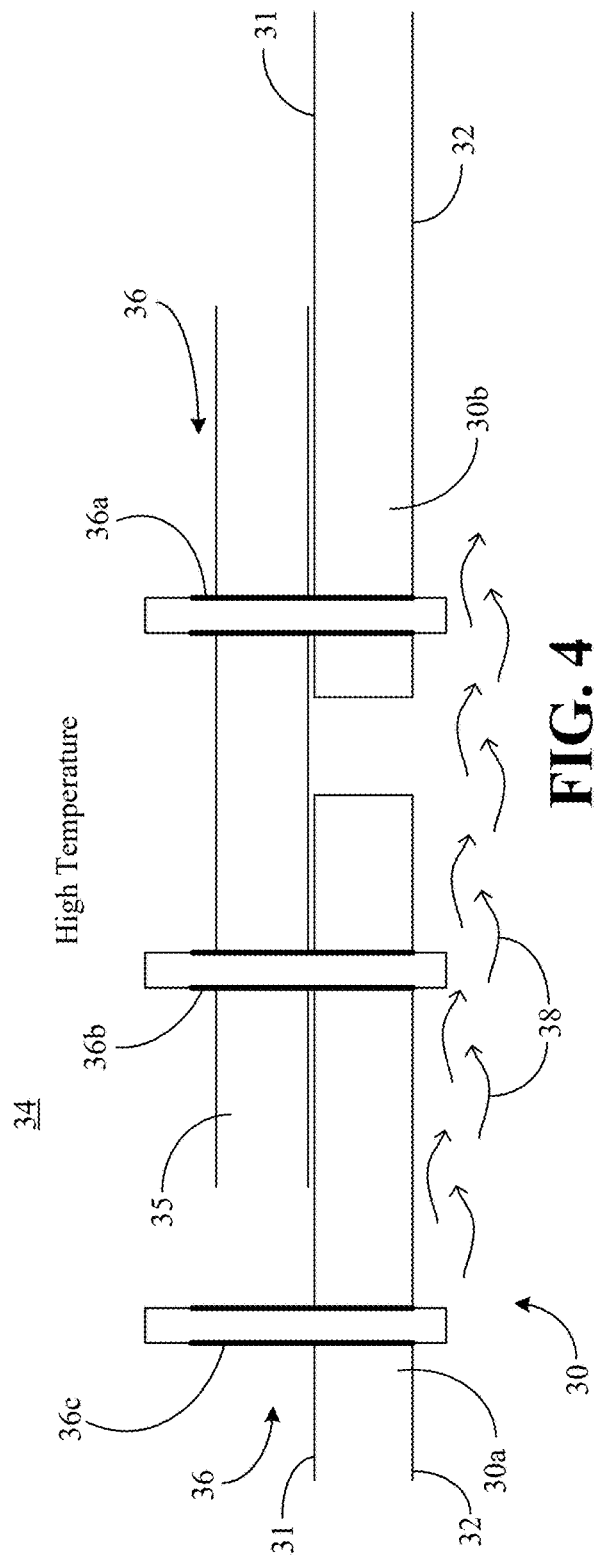

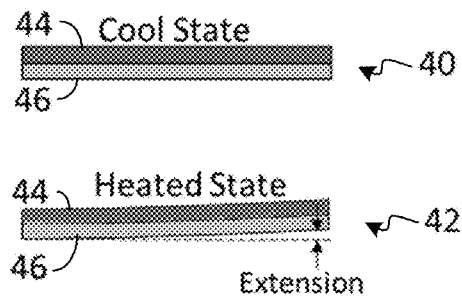
FIG. 5A
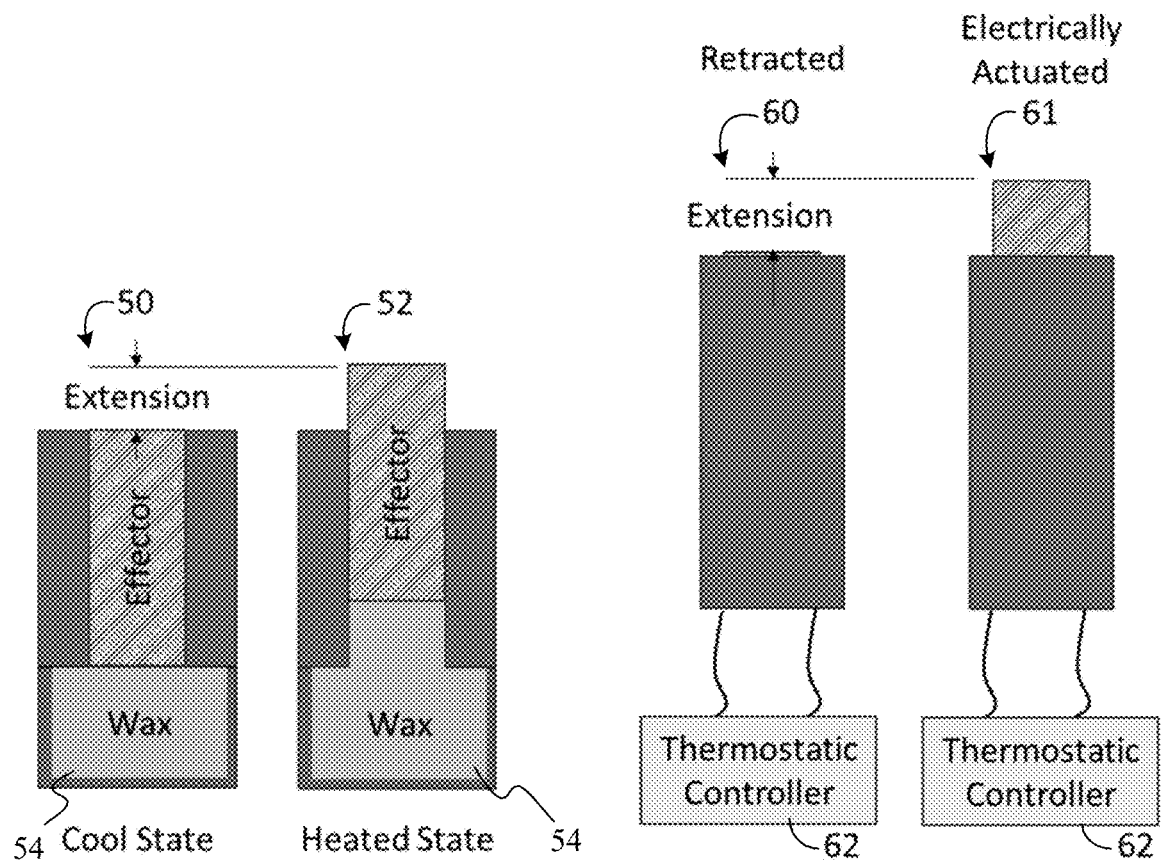
FIG. 5B
FIG. 5C

THERMALLY ACTIVATED FLOW CONTROL DEVICE

TECHNICAL FIELD

The technology described herein is generally related to engine aerodynamics. More particularly, the technology described herein relates to a turbofan engine inlet subassembly having a thermally activated air-flow control device.

BACKGROUND

A turbofan engine (e.g., "turbofan", "fanjet") is a type of airbreathing jet engine that is widely used in aircraft propulsion. A turbofan typically includes a combustion chamber and a ducted fan, where some of the air taken in by the turbofan bypasses the combustion chamber and is used to drive the ducted fan. When operated in relatively cold ambient temperatures, the turbofan inlet may be heated by an airplane engine system functioning in an engine anti ice (EAI) mode. This system delivers heated air to the interior of the turbofan inlet to prevent hazardous conditions associated with the formation of ice on the inlet. A potential failure of the EAI system can significantly increase the internal temperature of the turbofan inlet structures beyond normal operating temperatures. Continued operation under these conditions could result in failure of the turbofan inlet structures supporting the inlet.

SUMMARY

In accordance with one or more examples, a turbofan engine inlet subassembly comprises a lip skin surface (e.g., forward of the fan cowl) including a first side and a second side, and one or more flow effectors coupled to the lip skin surface, wherein the one or more flow effectors are to transition from a retracted position to an extended position on the second side of the lip skin surface in response to an ambient temperature on the first side of the fan cowl surface exceeding a first threshold.

In accordance with one or more examples, a method of assembling a turbofan engine subassembly comprises providing an inlet surface including a first side and a second side, and coupling one or more flow effectors to the inlet surface, wherein the one or more flow effectors are to transition from a retracted position to an extended position on the second side of the inlet surface in response to an ambient temperature on the first side of the inlet surface exceeding a first threshold.

In accordance with one or more examples, a method of operating a turbofan engine subassembly comprises detecting, by one or more flow effectors coupled to an inlet surface, that an ambient temperature on a first side of the inlet surface has exceeded a first threshold, and transitioning, by the one or more flow effectors, from a retracted position to an extended position on a second side of the inlet surface in response to the ambient temperature on the first side of the inlet surface exceeding the first threshold.

BRIEF DESCRIPTION OF THE DRAWINGS

The various advantages of the examples will become apparent to one skilled in the art by reading the following specification and appended claims, and by referencing the following drawings, in which:

FIG. 3 is a sectional view of an example of an enhanced inlet surface and supporting structure having flow effectors in a retracted position according to the technology described herein;

FIG. 4 is a sectional view of an example of an enhanced inlet surface and supporting structure having flow effectors in an extended position according to the technology described herein;

FIG. 5A is a side view of an example of a bi-metallic material according to the technology described herein;

FIG. 5B is a perspective view of an example of a wax motor according to the technology described herein;

FIG. 5C is a perspective view of an example of a piezoelectric actuator according to the technology described herein;

DESCRIPTION OF EMBODIMENTS

Figure 1:
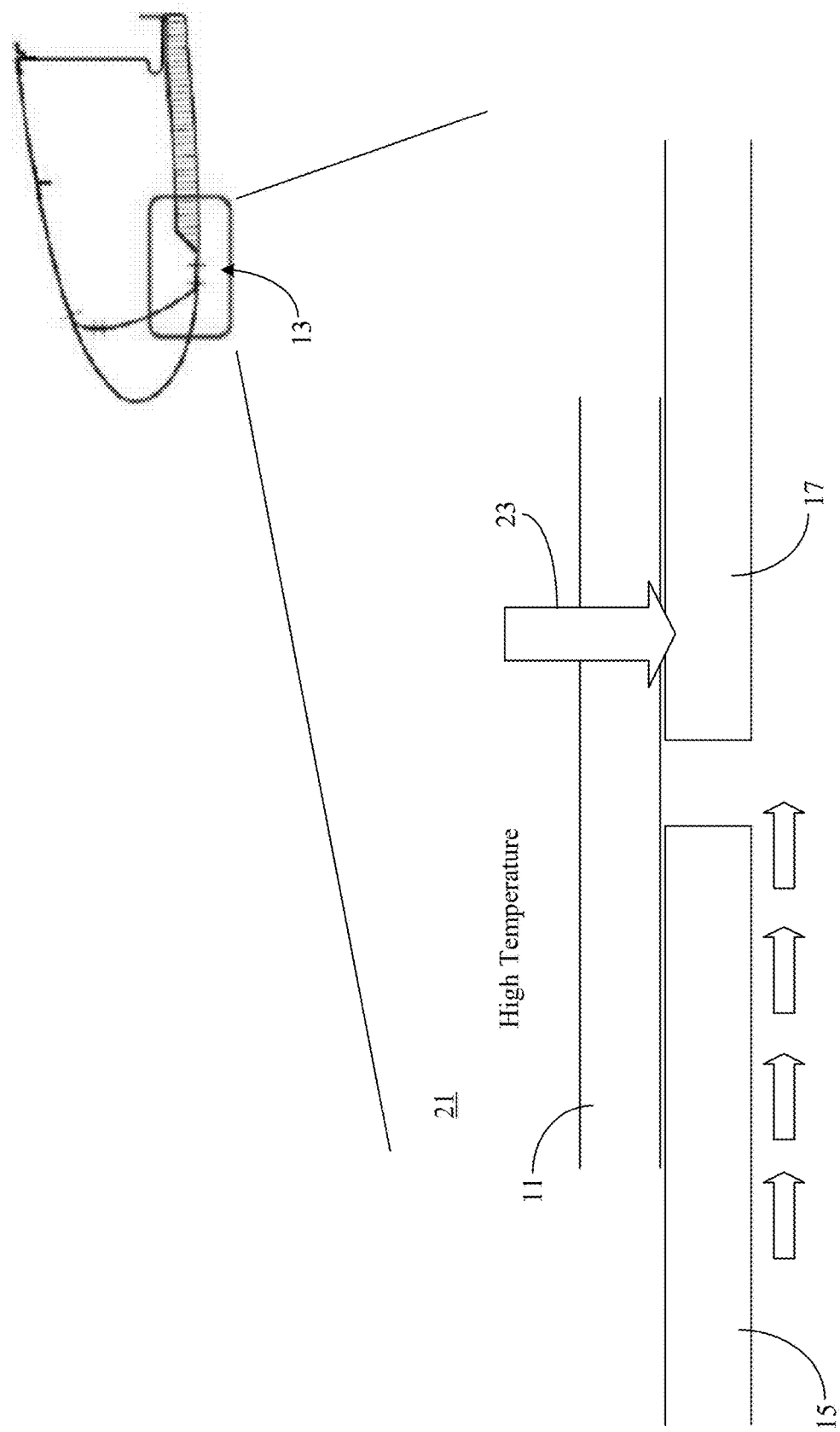
FIG. 1 is a sectional view of an example of a conventional inlet as attached to the inner barrel of the engine cowl in an engine.

Turning now to FIG. 1, a turbofan typically includes a combustion chamber and a ducted fan (not shown), where some of the air 19 (e.g., inlet airflow) taken in by the turbofan bypasses the combustion chamber and is used to drive the ducted fan. When operated in certain conditions conducive to ice formation, the turbofan may be operated in an engine anti ice (EAI) mode, which delivers warm air to the interior 21 of the turbofan inlet to prevent hazardous conditions associated with the formation of ice on the exterior of an inlet lip skin 15. During EAI mode operation, heat 23 may conduct from a bulkhead flange 11 on the interior 21 of the physical protection of the ducted fan (e.g., fan cowl) to an edge band 17 and/or the lip skin 15 on the exterior 13 of the fan cowl. As already noted, with a certain EAI failure condition, continued operation could result in a structural failure at the edge band 17.

While static/stationary flow effectors such as trip dots/strips, protruding fasteners, dimples and/or channels may be used to disrupt the laminar flow of the air 19 across the exterior of the inlet surface and improve cooling during EAI failure conditions, there remains considerable room for improvement. For example, static flow effectors can interfere with normal operations by increasing ice accumulation or increasing fan tone noise caused by extra flow distortion into the fan.

The technology described herein provides for movable flow effectors that can transition between a retracted position and an extended position based on the internal ambient temperature of the inlet surface. Such a solution enables the creation of turbulent flow and improved cooling of inlet air when there is excessive heating resulting from a failure of the EAI system. This solution also has no adverse effect on the accumulation of ice or fan tone noise when the EAI system is operating normally, which avoids additional certification validation for these issues.

Figure 2:
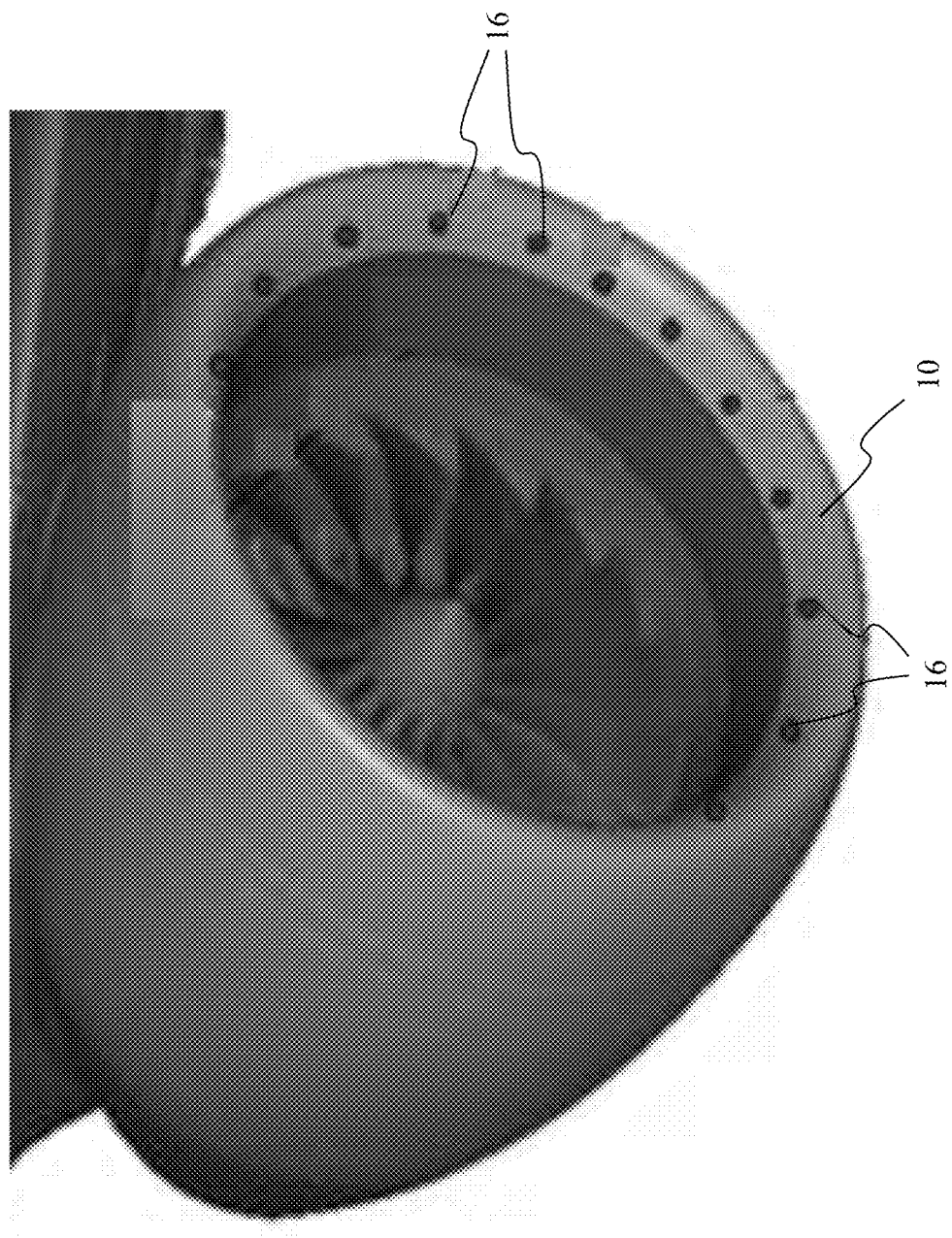
FIG. 2 is a perspective view of an example of a turbofan engine according to the technology described herein.

Turning now to FIG. 2, a turbofan engine is shown in which an inlet surface 10 includes a first (e.g., interior/internal, not shown) side and a second (e.g., exterior/ external) side. In the illustrated example, a turbofan engine subassembly includes one or more flow effectors 16 (e.g., thermally activated flow control devices) coupled to the inlet surface 10. As will be discussed in greater detail, the flow effector(s) 16 transition from a retracted position (as shown) to an extended position (not shown) on the second side of the inlet surface 10 in response to an ambient temperature on the first side of the inlet surface 10 exceeding a first threshold (e.g., when EAI mode is active). Additionally, the flow effector(s) 16 can transition from the extended position back to the retracted position in response to the ambient temperature falling below a second threshold (e.g., when EAI mode is inactive). The first threshold and the second threshold may be the same or different temperature values (e.g., to achieve a hysteresis effect). Additionally, the movable flow effector(s) 16 may include a bi-metallic material, a wax motor, a piezoelectric element (e.g., coupled to a thermostatic controller), etc., or any combination thereof.

The movable flow effector(s) 16 therefore enhance performance by creating turbulent flow and improving cooling of inlet air during the engine the anti-ice (EAI) failure condition. The movable flow effector(s) 16 further enhance performance by preventing the accumulation of additional ice and increased fan tone noise when EAI is operating normally.

Turning now to FIG. 3, a turbofan engine subassembly is shown when the EAI system is operating normally. In the illustrated example, an inlet surface 30 (30a, 30b) includes a first (e.g., interior/internal) side 31 and a second (e.g., exterior, external) side 32. The inlet surface 30 may also include a lip skin 30a and/or an edge band 30b coupled to a bulkhead flange 35. Because the ambient temperature of an interior 34 of the inlet surface 30 is relatively low in normal EAI operation (e.g., a second threshold is not exceeded), a plurality of flow effectors 36 (36a-36b) are in a retracted position in which the flow effectors 36 are flush with the second side 32 of the inlet surface 30. In the illustrated state, the flow effectors 36 and the inlet surface 30 represent a turbofan engine subassembly, wherein the flow effectors 36 enable laminar flow to be maintained along the second side 32 of the inlet surface 30. The flushness of the flow effectors 36 eliminates the likelihood of additional ice accumulation because of the flow effectors 36 as well as additional fan noise.

FIG. 4 shows the turbofan assembly when the EAI is in a failure condition. Because the ambient temperature of the interior 34 of the inlet surface 30 is relatively high (e.g., a first threshold is exceeded), the plurality of flow effectors 36 have transitioned to an extended position on the second side 32 of the inlet surface 30. The extended position enables the flow effectors 36 to convert laminar airflow along the second side 32 of the inlet surface 30 to a turbulent flow 38, which improves cooling. The flow effectors 36, which can include a bi-metallic material, a wax motor, a piezoelectric actuator, etc., or any combination thereof, may be placed at various positions along the inlet surface 30. For example, a first flow effector 36a extends through the bulkhead flange 35 and the edge band 30b, a second flow effector 36b extends through the bulkhead flange 35 and the lip skin 30a, and a third flow effector 36c extends only through the lip skin 30a.

FIG. 5A shows a bi-metallic material that may be readily substituted for any one of the flow effector(s) 16 (FIGS. 2A and 2B) and/or the flow effectors 36 (FIGS. 3 and 4), already discussed. The illustrated bi-metallic material transitions between a retracted state/position 40 and an extended state/position 42. The transition is in response to a first metal 44 and a second metal 46 expanding at different rates when the metals 44, 46 are heated.

FIG. 5B shows a wax motor that may be readily substituted for any one of the flow effector(s) 16 (FIGS. 2A and 2B) and/or the flow effectors 36 (FIGS. 3 and 4), already discussed. The illustrated wax motor transitions between a retracted state/position 50 and an extended state/position 52. The transition is in response to a wax portion 54 of the thermostat element expanding and contracting in response to the presence or absence of heat.

FIG. 5C shows a piezoelectric actuator that may be readily substituted for any one of the flow effector(s) 16 (FIGS. 2A and 2B) and/or the flow effectors 36 (FIGS. 3 and 4), already discussed. The illustrated piezoelectric actuator transitions between a retracted state/position 60 and an extended state/position 61. The transition is in response to an electrical signal (e.g., voltage) from a thermostatic controller 62 coupled (e.g., through a wired/wireless connection) to the piezoelectric actuator. The thermostatic controller 62 (e.g., including a processor, non-volatile memory, volatile memory, etc.) can determine the ambient temperature via, for example, a temperature sensor and/or a signal from EAI system.

Figure 6:
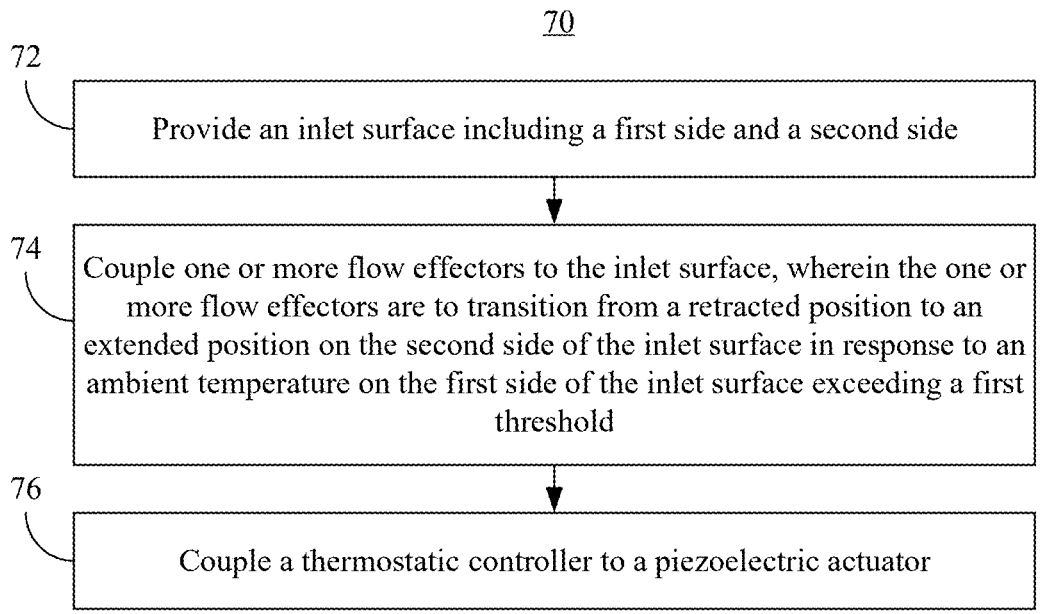
FIG. 6 is a flowchart of an example of a method of assembling a turbofan engine subassembly according to the technology described herein.

FIG. 6 shows a method 70 of assembling a turbofan engine subassembly such as, for example, the turbofan engine subassemblies of FIGS. 2-4, already discussed. The method 70 can generally be implemented via manufacturing technology and/or in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Illustrated processing block 72 provides an engine inlet surface (e.g., lip skin, edge band) including a first side and a second side. Block 74 couples one or more flow effectors (e.g., bi-metallic material, wax motor, piezoelectric actuator) to the inlet surface, wherein the one or more flow effectors are to transition from a retracted position to an extended position on the second side of the inlet surface in response to an ambient temperature on the first side of the inlet surface exceeding a first threshold. In an example, the one or more flow effectors also transition from the extended position to the retracted position in response to the ambient temperature on the first side of the inlet surface falling below a second threshold. If the one or more flow effectors include a piezoelectric actuator, block 76 couples a thermostatic controller to the piezoelectric actuator. Otherwise, block 76 can be bypassed.

In the retracted position, the one or more flow effectors may be flush with the second side of the inlet surface. By contrast, in the extended position, the one or more flow effectors convert laminar flow along the second side of the inlet surface to turbulent flow. In an example, the ambient temperature exceeding the first threshold is associated with an EAI failure condition.

Figure 7:
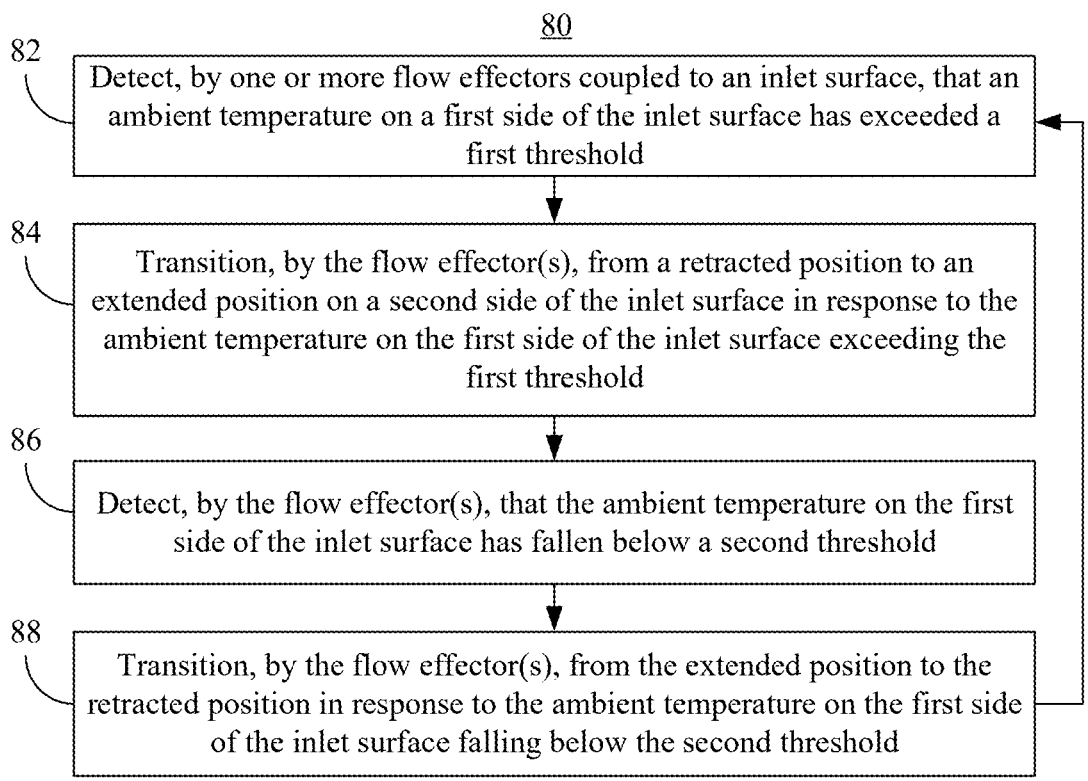
FIG. 7 is a flowchart of an example of a method of operating a turbofan engine subassembly according to the technology described herein.

FIG. 7 shows a method 80 of operating a turbofan engine subassembly. The method 80 can generally be implemented in any one of the turbofan engine subassemblies of FIGS. 2-4, already discussed. Illustrated processing block 82 provides for detecting, by one or more flow effectors coupled to an inlet surface, that an ambient temperature on a first side of the inlet surface has exceeded a first threshold. Block 84 transitions, by the flow effector(s), from a retracted position to an extended position on a second side of the inlet surface in response to the ambient temperature on the first side of the inlet surface exceeding the first threshold. In the retracted position, the flow effector(s) may be flush with the second side of the inlet surface. Additionally, the ambient temperature exceeding the first threshold may be associated with an EAI failure condition. In the extended position, the flow effector(s) may convert laminar flow along the second side of the inlet surface to turbulent flow. Block 84 may also provide for generating a notification (e.g., audible via speaker and/or wireless transition) that the flow effector(s) have transitioned from the retracted position to the extended position. Such a notification can facilitate the initiation diagnostic operations (e.g., to determine the cause of the high temperature), the replacement of one or more of the flow effectors, and so forth.

In an example, block 86 detects, by the flow effector(s), that the ambient temperature on the first side of the inlet surface has fallen below a second threshold. Additionally, block 88 transitions, by the flow effector(s), from the extended position to the retracted position in response to the ambient temperature on the first side of the inlet surface falling below the second threshold. The first threshold and the second threshold may be the same or different temperature values (e.g., to achieve a hysteresis effect). The method 80 therefore enhances performance at least to the extent that the movable flow effectors enable the creation of turbulent flow and improved cooling of the inlet surface when there is a failure of the EAI system. The movable flow effectors have no impact on the accumulation of ice and or fan tone noise when EAI system is operating normally.

Additional Notes and Examples

Example one includes a turbofan engine subassembly comprising an inlet surface including a first side and a second side, and one or more flow effectors coupled to the inlet surface, wherein the one or more flow effectors are to transition from a retracted position to an extended position on the second side of the inlet surface in response to an ambient temperature on the first side of the inlet surface exceeding a first threshold.

Example two includes the turbofan engine subassembly of Example one, wherein the one or more flow effectors are to transition from the extended position to the retracted position in response to the ambient temperature on the first side of the inlet surface falling below a second threshold.

Example three includes the turbofan engine subassembly of Example one, wherein in the retracted position, the one or more flow effectors are to be flush with the second side of the inlet surface.

Example four includes the turbofan engine subassembly of Example one, wherein in the extended position, the one or more flow effectors are to convert laminar flow along the second side of the inlet surface to turbulent flow.

Example five includes the turbofan engine subassembly of Example one, wherein the ambient temperature exceeding the first threshold is to be associated with an engine anti ice system failure.

Example six includes the turbofan engine subassembly of Example one, wherein one or more flow effectors include a bi-metallic material.

Example seven includes the turbofan engine subassembly of Example one, wherein the one or more flow effectors include a wax motor.

Example eight includes the turbofan engine subassembly of Example one, wherein the one or more flow effectors include a piezoelectric actuator, and a thermostatic controller coupled to the piezoelectric actuator.

Example nine includes the turbofan engine subassembly of Example one, wherein the inlet surface includes a lip skin.

Example ten includes the turbofan engine subassembly of Example one, wherein the inlet surface includes an edge band.

Example eleven includes a method of assembling a turbofan engine subassembly, the method comprising providing an inlet surface including a first side and a second side, and coupling one or more flow effectors to the inlet surface, wherein the one or more flow effectors are to transition from a retracted position to an extended position on the second side of the inlet surface in response to an ambient temperature on the first side of the inlet surface exceeding a first threshold.

Example twelve includes the method of Example eleven, wherein the one or more flow effectors are to transition from the extended position to the retracted position in response to the ambient temperature on the first side of the inlet surface falling below a second threshold.

Example thirteen includes the method of Example eleven, wherein in the retracted position, the one or more flow effectors are to be flush with the second side of the inlet surface, wherein in the extended position, the one or more flow effectors are to convert laminar flow along the second side of the inlet surface to turbulent flow, and wherein the ambient temperature exceeding the first threshold is to be associated with an engine anti ice system failure.

Example fourteen includes the method of Example eleven, wherein one or more flow effectors include one or more of a bi-metallic material, a wax motor, or a piezoelectric actuator, and wherein the inlet surface includes one or more of a lip skin or an edge band.

Example fifteen includes the method of Example eleven, further including coupling a thermostatic controller to the piezoelectric actuator.

Example sixteen includes a method of operating a turbofan engine subassembly, the method comprising detecting, by one or more flow effectors coupled to an inlet surface, that an ambient temperature on a first side of the inlet surface has exceeded a first threshold, and transitioning, by the one or more flow effectors, from a retracted position to an extended position on a second side of the inlet surface in response to the ambient temperature on the first side of the inlet surface exceeding the first threshold.

Example seventeen includes the method of Example sixteen, further including detecting, by the one or more flow effectors, that the ambient temperature on the first side of the inlet surface has fallen below a second threshold, and transitioning, by the one or more flow effectors, from the extended position to the retracted position in response to the ambient temperature on the first side of the inlet surface falling below the second threshold.

Example eighteen includes the method of Example sixteen, wherein in the retracted position, the one or more flow effectors are flush with the second side of the inlet surface.

Example nineteen includes the method of Example sixteen, wherein in the extended position, the one or more flow effectors convert laminar flow along the second side of the inlet surface to turbulent flow.

Example twenty includes the method of Example sixteen, wherein the ambient temperature exceeding the first threshold is associated with an engine anti ice system failure.

Example twenty-one includes an apparatus comprising means for performing the method of any one of Examples eleven to twenty.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD (solid state drive)/NAND controller ASICS, and the like. In addition, in some of the drawings, signal conductor lines are represented with lines. Some can be different, to indicate more constituent signal paths, have a number label, to indicate a number of constituent signal paths, and/or have arrows at one or more ends, to indicate primary information flow direction. This, however, should not be construed in a limiting manner. Rather, such added detail can be used in connection with one or more exemplary embodiments to facilitate easier understanding of a circuit. Any represented signal lines, whether or not having additional information, can actually comprise one or more signals that can travel in multiple directions and can be implemented with any suitable type of signal scheme, e.g., digital or analog lines implemented with differential pairs, optical fiber lines, and/or single-ended lines.

Example sizes/models/values/ranges can have been given, although embodiments are not limited to the same. As manufacturing techniques (e.g., photolithography) mature over time, it is expected that devices of smaller size could be manufactured. In addition, well known power/ground connections to IC chips and other components can or cannot be shown within the figures, for simplicity of illustration and discussion, and so as not to obscure certain aspects of the embodiments. Further, arrangements can be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A turbofan engine subassembly comprising:
   an inlet surface including a first side and a second side; and
   one or more flow effectors coupled to the inlet surface, wherein the one or more flow effectors are to transition from a retracted position to an extended position on the second side of the inlet surface that extends through a bulkhead flange and a lip skin or edge band in response to an ambient temperature on the first side of the inlet surface exceeding a first threshold.

2. The turbofan engine subassembly of claim 1, wherein the one or more flow effectors are to transition from the extended position to the retracted position in response to the ambient temperature on the first side of the inlet surface falling below a second threshold.

3. The turbofan engine subassembly of claim 2, wherein the first threshold and the second threshold are different.

4. The turbofan engine subassembly of claim 1, wherein in the retracted position, the one or more flow effectors are to be flush with the second side of the inlet surface.

5. The turbofan engine subassembly of claim 1, wherein in the extended position, the one or more flow effectors are to convert laminar flow along the second side of the inlet surface to turbulent flow.

6. The turbofan engine subassembly of claim 1, wherein the ambient temperature exceeding the first threshold is to be associated with an engine anti ice system failure.

7. The turbofan engine subassembly of claim 1, wherein the one or more flow effectors include a wax motor.

8. The turbofan engine subassembly of claim 1, wherein the one or more flow effectors include:
   a piezoelectric actuator; and
   a thermostatic controller coupled to the piezoelectric actuator.

9. The turbofan engine subassembly of claim 1, wherein the inlet surface includes the lip skin.

10. The turbofan engine subassembly of claim 1, wherein the inlet surface includes the edge band.

11. A method of assembling a turbofan engine subassembly, the method comprising:
    providing an inlet surface including a first side and a second side; and
    coupling one or more flow effectors to the inlet surface, wherein the one or more flow effectors are to transition from a retracted position to an extended position on the second side of the inlet surface that extends through a bulkhead flange and a lip skin or edge band in response to an ambient temperature on the first side of the inlet surface exceeding a first threshold.

12. The method of claim 11, wherein the one or more flow effectors are to transition from the extended position to the retracted position in response to the ambient temperature on the first side of the inlet surface falling below a second threshold.

13. The method of claim 11, wherein in the retracted position, the one or more flow effectors are to be flush with the second side of the inlet surface, wherein in the extended position, the one or more flow effectors are to convert laminar flow along the second side of the inlet surface to turbulent flow, and wherein the ambient temperature exceeding the first threshold is to be associated with an engine anti ice system failure.

14. The method of claim 11, wherein the one or more flow effectors include one or more of a wax motor, or a piezoelectric actuator, and wherein the inlet surface includes the lip skin or the edge band.

15. The method of claim 14, further including coupling a thermostatic controller to the piezoelectric actuator.

16. A method of operating a turbofan engine subassembly, the method comprising:
   detecting, by one or more flow effectors coupled to an inlet surface, that an ambient temperature on a first side of the inlet surface has exceeded a first threshold; and
   transitioning, by the one or more flow effectors, from a retracted position to an extended position on a second side of the inlet surface that extends through a bulkhead flange and a lip skin or edge band in response to the ambient temperature on the first side of the inlet surface exceeding the first threshold.

17. The method of claim 16, further including:
   detecting, by the one or more flow effectors, that the ambient temperature on the first side of the inlet surface has fallen below a second threshold; and
   transitioning, by the one or more flow effectors, from the extended position to the retracted position in response to the ambient temperature on the first side of the inlet surface falling below the second threshold.

18. The method of claim 16, wherein in the retracted position, the one or more flow effectors are flush with the second side of the inlet surface.

19. The method of claim 16, wherein in the extended position, the one or more flow effectors convert laminar flow along the second side of the inlet surface to turbulent flow.

20. The method of claim 16, wherein the ambient temperature exceeding the first threshold is associated with an engine anti ice system failure.

* * * * *